Nov. 14, 1950  J. R. MARCUS  2,530,257
APPARATUS FOR TESTING COATINGS
Filed Dec. 9, 1944  4 Sheets-Sheet 1
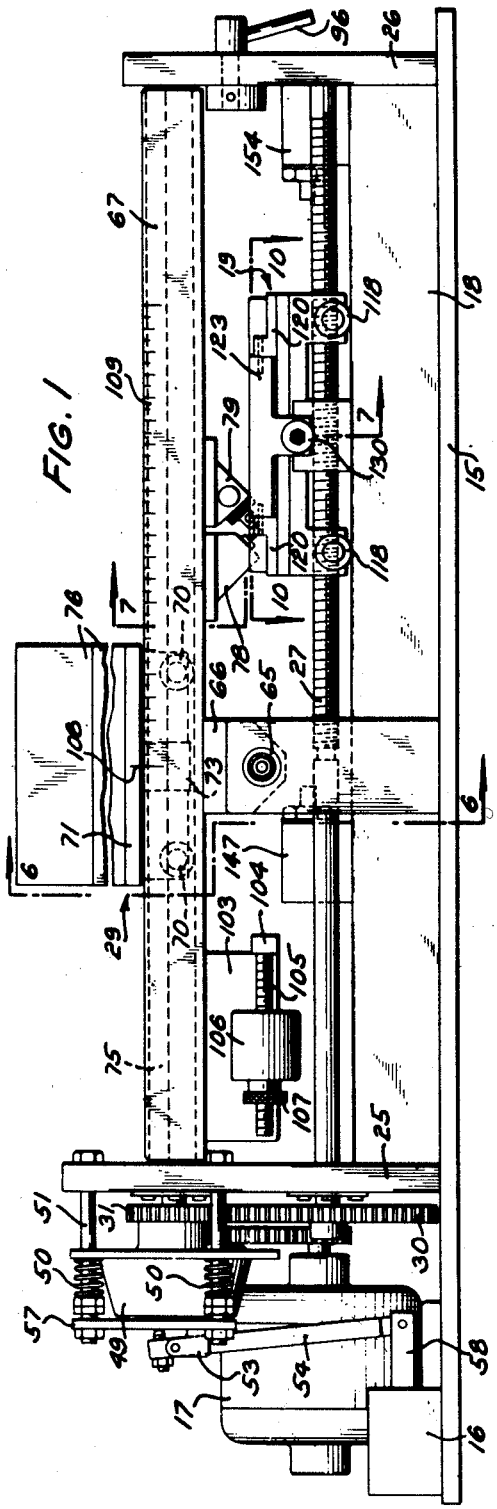
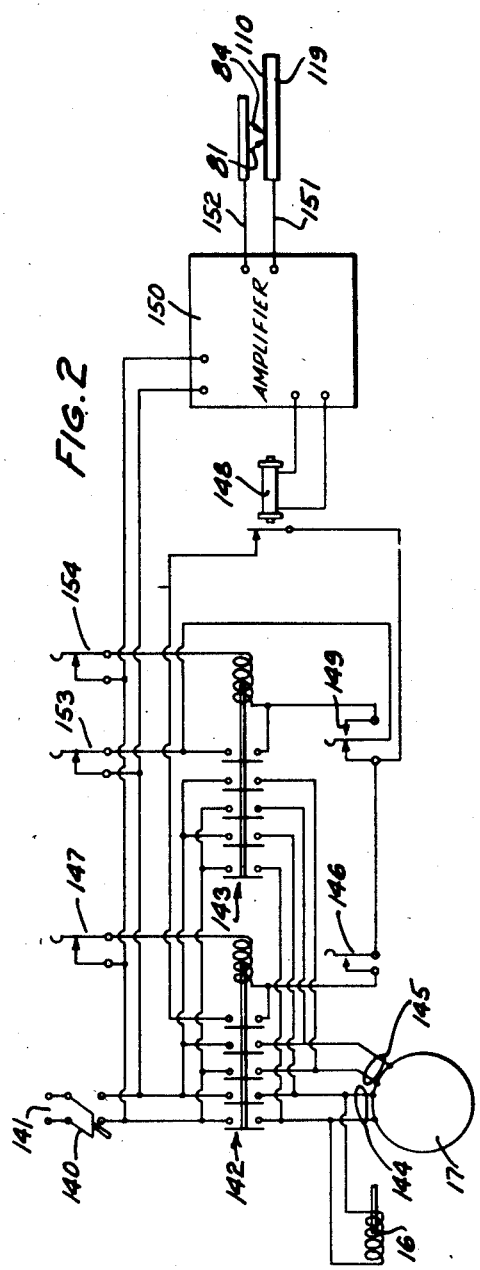
INVENTOR
J. R. MARCUS
BY
ATTORNEY Nov. 14, 1950   J. R. MARCUS   2,530,257
APPARATUS FOR TESTING COATINGS
Filed Dec. 9, 1944   4 Sheets-Sheet 2
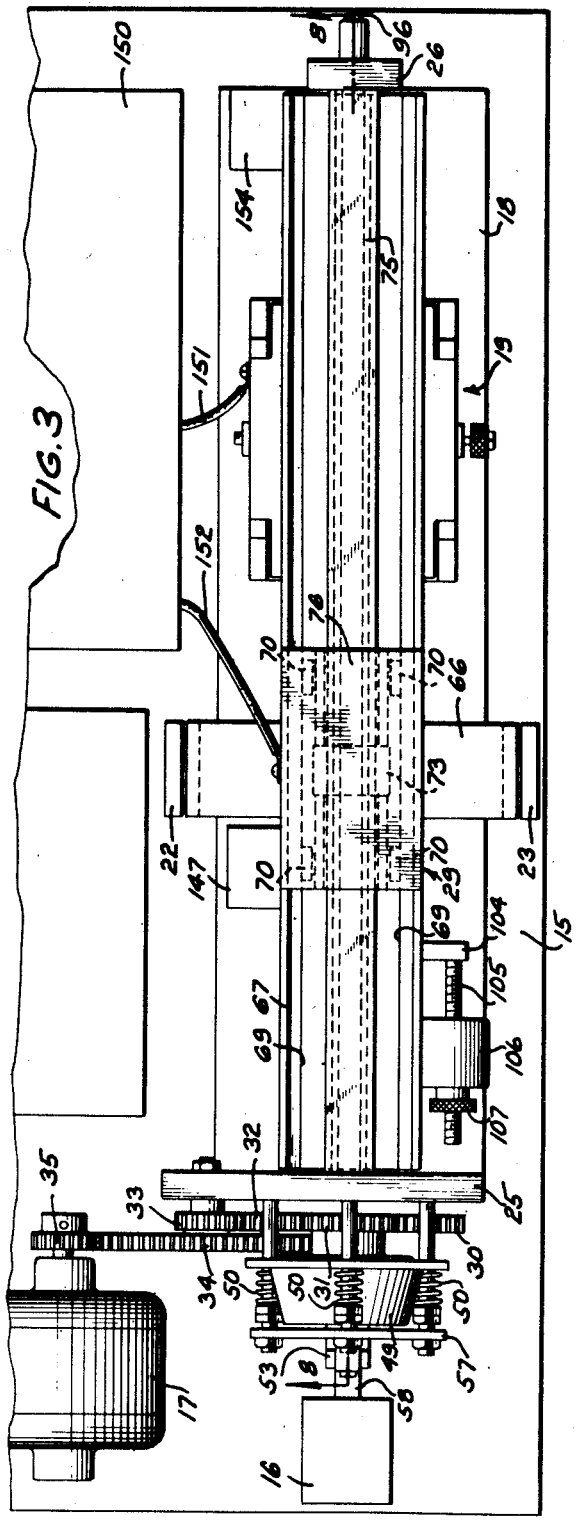
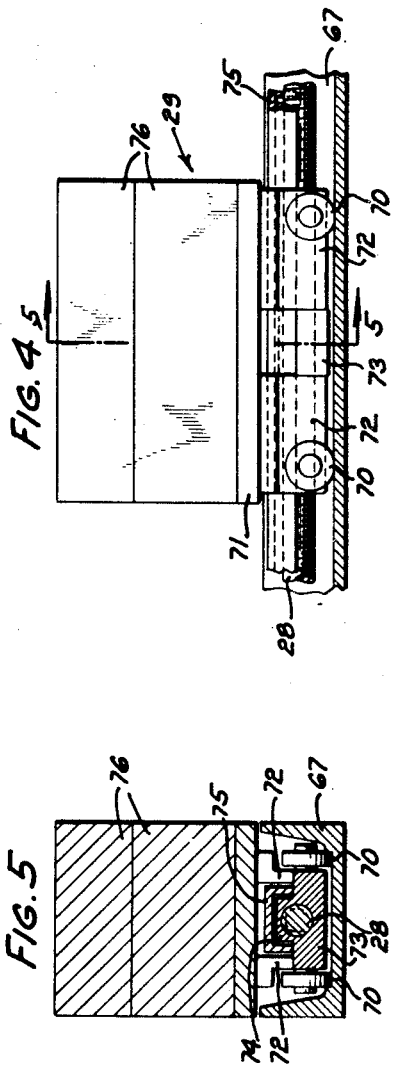
INVENTOR
J. R. MARCUS
BY Harry R. Duft
ATTORNEY

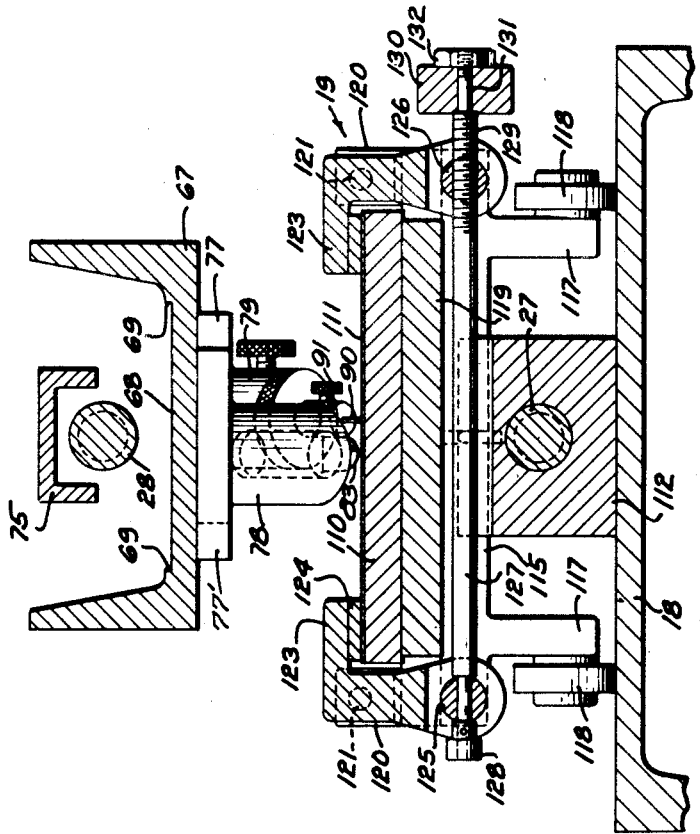

Nov. 14, 1950   J. R. MARCUS   2,530,257
APPARATUS FOR TESTING COATINGS
Filed Dec. 9, 1944   4 Sheets-Sheet 4
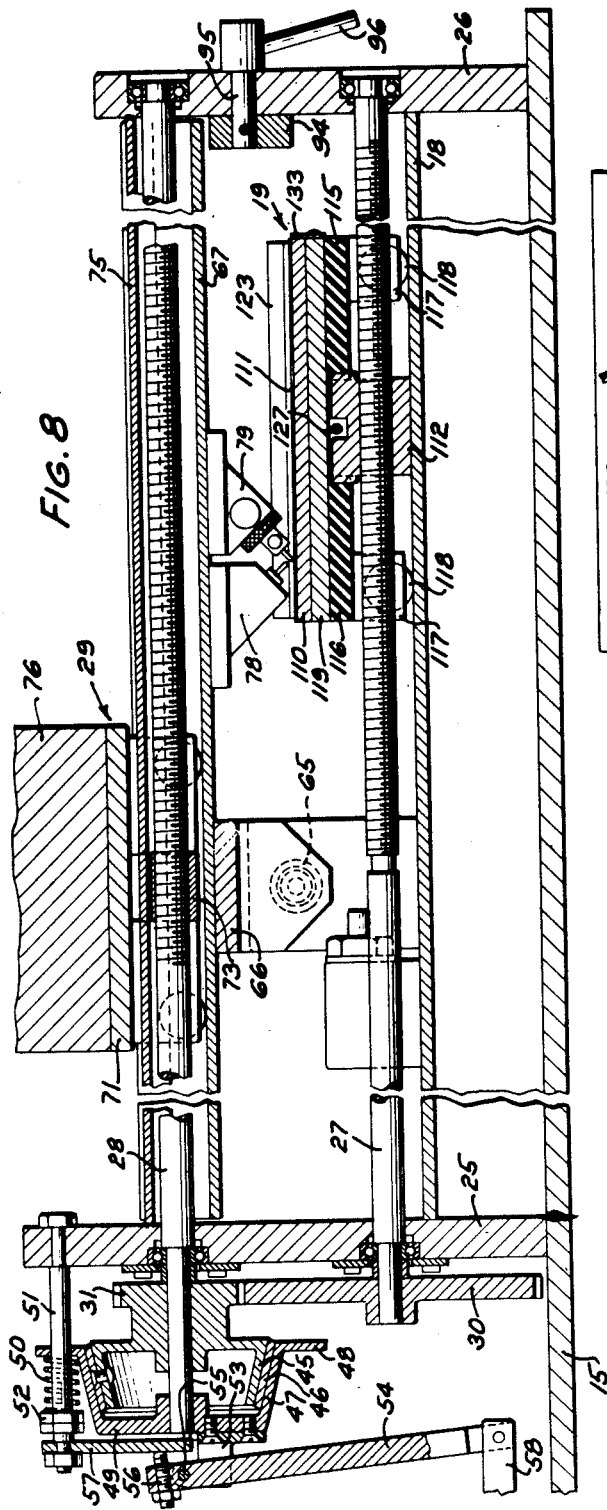
INVENTOR
J. R. MARCUS
BY Harry R. Duft
ATTORNEY Patented Nov. 14, 1950

2,530,257

UNITED STATES PATENT OFFICE 2,530,257

APPARATUS FOR TESTING COATINGS

Jerome R. Marcus, Chicago, Ill., assignor to Western Electric Company, Incorporated, New York, N. Y., a corporation of New York Application December 9, 1944, Serial No. 567,409

5 Claims. (Cl. 73—150)

This invention relates to apparatus for testing coatings and more particularly to an apparatus for testing the mar resistance and scratch adhesion of paints.

It is an object of the present invention to provide a simple and highly accurate apparatus for testing coatings.

In accordance with one embodiment of the invention, a pair of probes, which may be alternately rendered operable, are mounted upon the underside of a beam in position to engage a test specimen mounted on a travelling carriage beneath the beam. The beam is pivoted for oscillation and carries a weight supporting carriage which may be fed along the beam, to change the lever arm thereof, by a motor driven screw driving in synchronism with a driving screw for the carriage which supports the specimen whereby, after one of the probes has been selectively rendered operable, the lever arm of the beam is gradually changed to apply a gradually increasing weight to the probe engaging a test sample on the carriage and simultaneously therewith the carriage is moved to drag the test specimen in the path of the probe. A control circuit is provided whereby the driving power for the motor is interrupted when a probe breaks through the paint coating on the test specimen, and the position of the weight at the time that the motor circuit is interrupted may be read upon a scale scribed on the beam, thereby to indicate the amount of pressure required to to force a probe through the paint coating.

A complete understanding of the invention may be had by reference to the following detailed description when considered in conjunction with the accompanying drawings, wherein Fig. 1 is a side elevational view of an apparatus for testing coatings made in accordance with the present invention;

Fig. 2 is a circuit diagram illustrating the control circuit schematically;

Fig. 3 is a plan view of the apparatus shown in Fig. 1, part being broken away to conserve space;

Fig. 4 is a side elevational view of the weight supporting carriage which travels along the beam, part of the beam being broken away to more clearly illustrate details of the carriage;

Fig. 5 is a transverse vertical sectional view taken substantially along the line 5—5 of Fig. 4 in the direction of the arrows showing details of construction of the beam and weight supporting carriage;

Fig. 6 is an irregular vertical sectional view taken substantially along the line 6—6 of Fig. 1 in the direction of the arrows showing the specimen supporting carriage in end elevation;

Fig. 7 is an irregular vertical sectional view on an enlarged scale, taken substantially along the line 7—7 of Fig. 1 in the direction of the arrows, and showing the specimen supporting carriage and drive therefor in section;

Fig. 8 is a longitudinal sectional view on an enlarged scale, taken substantially along the line 8—8 of Fig. 3 in the direction of the arrows and showing the details of the drive mechanism for the weight supporting carriage and specimen supporting carriage;

Fig. 9 is an enlarged fragmentary side elevational view of the beam and probes and showing the structure whereby the probes may be alternately rendered operable; and Fig. 10 is a fragmentary plan view taken substantially along the line 10—10 of Fig. 1 and showing, on an enlarged scale, a carriage for supporting the test specimen, parts being broken away to illustrate a means whereby the test specimen supporting carriage may be shifted transversely of the path of movement of the carriage to dispose various portions of the test specimen to be acted upon by the probes.

In the drawings, the apparatus is illustrated as being mounted upon a base member 15, on which there is mounted a brake releasing solenoid 16 and a driving motor 17. In addition to supporting the brake releasing solenoid and driving motor, the base 15 supports an inverted channel member 18, the upper surface of which comprises a trackway for a specimen supporting carriage, designated generally by the numeral 19. Intermediate the ends of the inverted channel member 18, a pair of blocks 20 and 21 are positioned to serve as spacer members for bearing plates 22 and 23, respectively, which, together with the blocks 20 and 21, are attached to the inverted channel member 18 by means of machine screws 24—24. At the ends of the channel member 18, upright members 25 and 26 are attached thereto to serve as bearings for a pair of drive screws 27 and 28 journalled in anti-friction bearings in the upright members and adapted to drive the specimen supporting carriage 19 and a weight supporting carriage, indicated generally by the reference numeral 29, respectively.

The drive screws 27 and 28 have gears 30 and 31 fixed to them and meshing one with another. The gear 31 also meshes with an idler gear 32 suitably mounted for free rotation on the upright member 25 and, in turn, meshing with an intermediate gear 33. The gear 33 is freely rotatable with respect to the upright member 26 and has attached to it a large driving gear 34, which, in turn, meshes with a spur gear 35 on the drive shaft of the motor 17. Thus, when the motor 17 is actuated, rotation will be imparted through the gear train just described to drive the drive screws 27 and 28 simultaneously.

Formed integrally with or suitably attached to the gear 31 is a frusto-conical brake drum 45 having a brake band 46 attached thereto for engagement by the internal surfaces of a brake member 47 slidably engaging the reduced end of the screw 28. The brake member 47 is provided with a flange 48 and a head 49 and the flange 48 is engaged by compression springs 50—50 which surround posts 51—51 mounted in the upright member 25 and are compressed between the flange 48 and lock nut assemblies 52—52 threaded onto the posts 51. Thus, the compression springs 50—50 urge the brake member 47 to engage the brake band 46 on the drum 45. Attached to the head 49 of the brake member 47 is a bracket 53 having a lever 54 pivoted thereto on a pin 55. The lever 54 carries an adjustable abutment member 56, which engages a plate 57 attached to the ends of the posts 51. The lever 54 is pivotally connected to a solenoid core 58, which, upon actuation of the brake releasing solenoid 16, will be moved to the left, as viewed in Figs. 1 and 8, to rock the lever 54 clockwise and withdraw the brake member 47 from engagement with the brake band 46 whenever the motor 17 is operated, as will be described more in detail hereinafter.

Journalled for free oscillation in anti-friction bearings 65 positioned at the upper ends of the bearing plates 22 and 23 is a beam supporting yoke 66, to which a channel-shaped beam 67 may be suitably attached, for example, by welding or bolting, the two members together. The channel-shaped beam 67, as shown most clearly in Figs. 6 and 7, has a flat surface 68 milled in it to a sufficient depth to provide a pair of guide shoulders 69—69, which serve to guide the wheels 70—70 of the weight-supporting carriage 29. The weight-supporting carriage 29 comprises a weight-supporting plate 71, from which there extend four legs 72—72, on each of which there is mounted one of the wheels 70. The legs 72—72 are spaced apart a distance sufficient to receive an irregularly shaped travelling nut 73, which threadedly engages the drive screw 28 and extends transversely of the carriage 29 a sufficient distance to engage the legs 72, whereby, when the drive screw 28 is rotated, the carriage 29 will move along the channel-shaped beam 67. The travelling nut 73 has an upwardly extending portion 74, which enters into the channel of an inverted channel member 75 attached to and extending between the upright members 25 and 26. This channel member serves to prevent rotation of the travelling nut 73 with respect to the carriage 29 and prevents any torque being applied to the carriage 29 which might tend to support the carriage and weights 76—76 mounted on the weight-supporting plate 71.

Suitably attached to the under side of the beam 67, as shown most clearly in Figs. 7 and 9, are a pair of probe-supporting blocks 77′ and 77 having chuck members 78 and 79, respectively, formed integrally with them. The chuck 78 has an aperture 80 formed in it for receiving a probe member 81, which may be locked in place in the aperture 80 by means of a set screw 82. The probe member 81 is provided with a rounded point 83, which, when engaged with a coating of paint on the test specimen, will abrasively engage the coating and tend to scrape the coating from the test specimen and thereby effect a scratch adhesion test on the specimen. The chuck 79 is provided with a probe receiving aperture 93, in which a probe member, designated generally by the numeral 84, may be positioned. The probe member 84 is provided with a shank 85, in which there is formed a groove 86. The shank portion of the probe member 84 extends into the aperture 93 a sufficient distance so that a flat surface of a knurled flange 87 will engage a face of the chuck 79 and the groove 86 will be in alignment with the nib of a set screw 88 having a knurled head. Disposed eccentrically with respect to the shank 85 is a needle-receiving portion 89 adapted to receive a needle 90, which is held in the portion 89 by a thumb screw 91. As shown in the various figures of the drawing, the needle 90 is positioned to extend just below the rounded point 83 of the probe 81. However, upon loosening the set screw 88, the probe member 84 may be rotated 180° to carry its eccentric portion to a higher position than that shown in the various figures and to thus move the needle 90 to a position where its point will be above the rounded point 83 of the probe 81 and then the probe 83 will engage a test panel to make the scratch adhesion test on a coating on the test specimen or panel. When the probe member 84 is in the position shown in the various figures, a mar resistance test will be made on the test panel. The probe may be disengaged from the test specimen by manually manipulating an eccentric 94 mounted on a shaft 95, which is journalled in the upright member 26 and is provided with a handle 96, whereby it may be manipulated. The eccentric 94 is positioned below the end of the beam 67 and may be manipulated to raise the beam and carry the probes out of engagement with the specimen on the carriage 19.

In order to counterbalance the weight of the probes 81 and 84 and their supporting devices, a weight 103 is attached to the under side of the beam 67 to the left of its bearings (Fig. 1). This weight has a bar 104 attached to it for carrying a threaded support post 105, on which a weight 106 is threaded. The weight 106 is provided with a knurled lock nut 107, whereby the weight may be rotated on the post 105 to adjust the beam 67 and then locked in place so that it will exactly balance when the carriage 29 carrying the weights 76 is in the position shown in Fig. 1, where a reference line 108 on the carriage is at the zero point of a scale 109 scribed on the beam 67. The scale 109 may be graduated to indicate the amount of pressure applied to the probes at the various positions of the carriage 29 along the beam 67.

The specimen-supporting carriage 19 is adapted to carry a test specimen in the form of a plate or sheet of metal 110 having a protective coating 111, which is to be tested. The carriage 19 may be driven by a travelling nut 112 resting on the upper face of the channel member 18 and threadedly engaging the drive screw 27. The nut 112 has a pair of projections 113—113 on directly opposite edges thereof for entrance into a series of slots 114—114 formed in oppositely disposed portions 115 and 116 of the carriage 19. The portions 115 and 116 are made of insulating material and each has two legs 117 extending downwardly from it to rotatably support wheels 118—118, which ride upon the upper surface of the channel member 18. The portions 115 and 116 are suitably attached to a metallic bed 119, which is adapted to receive the test specimen in the form of the sheet of metal 110 with the coating to be tested on its upper surface.

Mounted upon the bed 119 are four pivot blocks 120—120, which carry pivot pins 121 in position to enter an intermediate portion 122 of a clamp 123 for pivotally supporting these clamps in position to clamp the sheet of metal 110 having the coating 111 on it in position to be tested. The lower face of each of the clamps 123 has a compressible insulating material cemented to it, for example, a strip of felt 124, which will engage the coating 111 on the sheet of metal 110 to clamp the specimen on the bed 119. At their lower ends, the clamps 123 are adapted to receive pivot members 125 and 126, which are freely oscillatable in suitable apertures formed in the lower edge of the clamp 123. The pivot member 125 engages a reduced portion of a rod 127 and is held in place on the reduced portion of the rod 127 by a cap member 128 pinned to the rod 127. The pivot member 126 is internally threaded to threadedly engage a threaded portion 129 of the rod 127 and rotation may be imparted to the rod 127 by a thumb nut 130 on a reduced square shank 131 of the rod 127, which shank is threaded to receive a retainer nut 132. When a test specimen in the form of a metallic plate 110 with a coating 111 is placed upon the bed 119, it may be moved into engagement with an end member 133, which is attached to the bed 119, whereby, upon movement of the carriage 19, the specimen will not be dragged away from the clamping members 123.

The control circuit for controlling the operation of the apparatus includes a main power supply switch 140, which, when closed, will connect current from a source 141 to the normally open contacts of a relay 142 and to the normally open contacts of a relay 143. The relay 142, upon energization, serves to supply power to the motor 17 to drive the motor in one direction and the relay 143, upon energization, serves to supply current to drive the motor 17 in the opposite direction. The motor 17 has a pair of leads 144, which will maintain it in operation in either direction, and has a pair of leads 145 connected to its starting winding (not shown) for initiating the operation of the motor 17 in either of two directions, depending upon whether the relay 142 or 143 is operated. Initiation of operation of relay 142 may be effected by closing a switch 146 to supply current through a normally closed switch 147 to the winding of relay 142 and, upon energization of relay 142, the relay will lock operated over its locking contacts and the normally closed contact of a relay 148, the normally closed contact of a reversing switch 149, and the normally closed contacts of an emergency stop switch 153. Relay 148 operates under control of an amplifier 150 connected to the source of current upon closure of the switch 140 and operable under control of whichever one of the probe members 81 or 84 is in operative contact with the test specimen on the bed 119 of the specimen-supporting carriage 19. The amplifier 150 is provided to permit the usage of a low value current at the probes, which is amplified in the amplifier to operate relay 148.

The probe which is being used, upon breaking through the coating on the test specimen, will complete a circuit from the amplifier 150 through a lead 152, through the beam 67 and probe, to the bed 119, which is connected back to the amplifier 150 by a lead 151. Thus, when the probe which is making a test on a test specimen breaks through the coating on the metallic sheet 110, it will complete a circuit through the amplifier 150 to energize the relay 148 and break the locking circuit to relay 142. The solenoid 16 is connected in parallel with the motor 17 and, when the motor 17 is deenergized, the solenoid 16 will also be deenergized. The circuit to the coil of relay 142, as pointed out hereinbefore, is completed through normally closed switch 147 and this switch is mounted upon the channel member 18 in such position, as indicated in Fig. 1, that the specimen-supporting carriage 19 will open the switch 147 when the carriage moves the test specimen to a position where the probes are adjacent the right end of a specimen on the carriage. The switch 146, in initiating the forward movement of the carriage 19, will complete a circuit through the normally closed contacts of switch 149 and normally closed contacts of the emergency stop switch 153 and the circuit through the windings of relay 142 will be maintained by the contacts of relay 148.

After a specimen has been tested by moving it beneath a probe, the carriage 19 may be returned to its right hand position (Fig. 1) by manipulating reversing switch 149, which will break the locking circuit for relay 142 and momentarily make a circuit to energize the winding of relay 143 over a circuit from the current source through a normally closed switch 154, the normally open and now closed contacts of switch 149, stop switch 153 and back to the current source. As soon as a relay 143 pulls up, it will remain locked up over a circuit from the current source through the stop switch 153, locking contacts of relay 143 and normally closed switch 154, back to the main current source at switch 140. This circuit will be maintained until the carriage 19 reaches its extreme right hand position (Fig. 1), where it will actuate the switch 154 to open the locking circuit for relay 143 after the carriage 19 is moved from under the probes.

A more complete understanding of the invention may be had by reference to the following brief description of the mode of operation of the apparatus. A test specimen, comprising a sheet of metal 110 having a coating 111 thereon, may be placed upon the bed 119 of the carriage 19 and the carriage may then be placed on the travelling nut 112 with the projections 113 of the nut 112 nested in opposed notches 114 in the portions 115 and 116 of the carriage 19. The carriage may be placed in engagement with the travelling nut 112, as just described, when the nut 112 is in its extreme right hand position and when the beam 67 is held in its upper inoperative position by the eccentric 94. The specimen supporting carriage 19, thus having been placed in the apparatus with a specimen positioned thereon, switch 140 may be closed to supply current to the various electrically operated portions of the apparatus and to prepare the apparatus for operation, whereupon switch 146 may be closed momentarily to initiate a testing operation, it being assumed that the probe 84 is in either its operative or in its inoperative position and is locked therein so that either a mar resistance or scratch adhesion test may be performed and it also being assumed that the proper weights 76 have been placed upon the weight-supporting carriage 29. With the apparatus thus conditioned for operation, the switch 146 may be operated to advance the carriage 19 to the position shown in Fig. 1, whereupon the beam 67 may be lowered to engage the probe with the coating 111 on the sheet of metal 110 comprising the test specimen. As the carriage 19 moves to the left from the position shown in Fig. 1 through the action of the travelling nut 112 and the drive screw 27, the carriage 29 will move to the right due to the cooperation between the drive screw 28 and the travelling nut 73, thus gradually increasing the load applied to the probe bearing on the test specimen. The carriage 19 will continue to move to the left until it engages the switch 147 to release the locking circuit for relay 142 or until the probe breaks through the coating on the test specimen and, through the amplifier 150, energizes relay 148 to stop the operation of the apparatus. If the probe does not break through the coating, the handle 96 may be manipulated to disengage the probes from the test specimen by lifting the right end of the beam 67, and reversing switch 149 may be momentarily operated to interrupt current to relay 142 and supply current to relay 143, to supply a current in a reverse direction through the leads 145 and thus reverse the direction of drive of the motor 17. The motor 17 will continue to drive the carriage 19 to the right and the carriage 29 to the left until the carriage 19 engages and operates switch 154 to break the locking circuit to the relay 143. The carriage thus being returned to its right hand or inoperative position, it may be picked up off the travelling nut 112 and reengaged therewith with the projections 113 engaging the next set of notches 114 and more weight may be placed upon the carriage 29 and the test specimen may then be retested with more weight on the weight-supporting carriage 29. These testing operations may be repeated, adding more weight to the carriage 29 until the coating 111 on the sheet of metal 110 has been broken, thereby to measure the mar resistance or scratch adhesion value of the coating 111. Furthermore, by changing the position of carriage 19, a series of tests may be made on a single test panel to determine the average mar resistance or scratch adhesion over different portions of its surface.

It should be noted that each time a circuit is completed to the motor 17, a circuit is completed in parallel to the solenoid 16 to release the brake member 47 from the brake band 46 and that each time the circuit to the motor 17 is broken, solenoid 16 will be deenergized to quickly stop any overrun of the feed screws, whereby the position of the reference line 108 on the weight supporting carriage 29 will give an accurate indication of the amount of weight required to break through the coating with the probe and thereby indicate either the mar resistance or scratch adhesion value of the coating 111, depending upon which probe is being used.

What is claimed is:

1. In an apparatus for testing a coating on a test panel, a supporting framework having a flat supporting surface, a rotatable threaded drive shaft longitudinally mounted on said framework in parallel relation to said flat supporting surface, a nut operatively engaging said threaded drive shaft and slidably engaging said framework for longitudinal movement thereon, a test panel supporting carriage mounted for movement on the supporting surface of said framework, an elongated transversely disposed recess in said carriage having wall portions slidably engageable with portions of said nut, a plurality of vertical slots formed in one of said wall portions of said carriage, a projection on said nut slidably engageable in said vertical slots, the arrangement of the nut and the carriage being such that the carriage may be vertically applied and connected to said nut in a plurality of positions transversely of the movement of the nut for longitudinal movement therewith, means on said carriage for clamping said panel thereto, a test probe engageable with the coating of a panel on said carriage, and means operable in timed relation to the rotation of said drive shaft for increasing the pressure of said probe on said coating.

2. In an apparatus for testing a coating on a test panel, a supporting framework having a supporting surface, a rotatable threaded drive shaft longitudinally mounted on said framework in parallel relation to said surface, a nut operatively engaging said threaded drive shaft and slidably engaging said framework for longitudinal movement thereon, a test panel supporting carriage supported for movement on the supporting surface of said framework, an elongated transversely disposed recess in said carriage having wall portions slidably engageable with portions of said nut, a plurality of vertical slots formed in one of said wall portions of said carriage, a projection on said nut slidably engageable in said vertical slots, the arrangement of the nut and the carriage being such that the carriage may be vertically applied and connected to said nut in a plurality of positions transversely of the movement of the nut for longitudinal movement therewith, a test probe engageable with the coating of a panel on said carriage, a beam pivoted on said framework and extending longitudinally thereof for supporting said test probe, a weight supporting carriage movable along said beam, a second rotatable threaded drive shaft longitudinally mounted on said framework in spaced relation to said beam, a nut operatively engaging said second drive shaft for longitudinal movement thereon, a channel member mounted on said framework adjacent and in parallel relation to said second drive shaft and engageable with the nut thereon to prevent its rotation, said weight supporting carriage having portions vertically slidably engageable with the nut on said second drive shaft for connecting said carriage to said nut for longitudinal movement therewith, and means for simultaneously driving said drive shafts.

3. In an apparatus for testing a coating on a test panel, a supporting framework having a supporting surface thereon, a rotatable threaded drive shaft longitudinally mounted on said framework parallel to said supporting surface, a nut operatively engaging said drive shaft and slidably engaging said framework for longitudinal movement thereon, a test panel supporting carriage supported for movement on the supporting surface of said framework, said carriage being recessed to receive a portion of said nut therein to establish a driving connection with said nut for longitudinal movement therewith, a test probe for engaging the coating of a panel on said carriage, a beam pivoted on said framework and extending longitudinally thereof for supporting said test probe, a weight-supporting carriage movable along said beam, a second rotatable threaded drive shaft longitudinally mounted in said framework in spaced relation to said beam, a nut operatively engaging said second drive shaft for longitudinal movement thereon, a channel member mounted on said framework in parallel relation to said second drive shaft and engageable with the nut thereon to prevent its rotation, said weight supporting carriage having portions vertically slidably engageable with said nut for connecting said carriage to said nut for longitudinal movement therewith, and a power drive for simultaneously driving said drive shafts.

4. In an apparatus for testing a coating on a test panel, a supporting framework having a supporting surface and a pair of upwardly extending end walls, a pair of rotatable threaded drive shafts journalled one above the other in said walls in spaced and parallel relation to the supporting surface of said framework and with the lowermost shaft adjacent thereto, a nut operatively engaging said lowermost drive shaft for longitudinal movement thereon and slidingly engaging the supporting surface of said framework, a nut operatively engaging the upper drive shaft for longitudinal movement thereon, a channel member mounted on said walls in spaced and parallel relation to said upper drive shaft and engageable with said nut for preventing the rotation thereof, a beam pivotally mounted on said framework and extending longitudinally thereof adjacent said upper drive shaft, a test panel carriage supported for movement on said flat supporting surface of said framework and engageable with the nut on said lower drive shaft for longitudinal movement therewith, a test probe mounted on said beam and engageable with the coating of a panel on said panel carriage, a weight supporting carriage movable longitudinally on said beam and vertically slidably engageable with the nut to establish a connection therewith for longitudinal movement with said nut, drive means for simultaneously rotating said drive shafts, and a cam member mounted on said wall and engageable with the end of said beam for moving the end thereof to raise the probe from the panel.

5. In an apparatus for testing a coating on a test panel, a supporting framework having a straight supporting surface and a pair of upright frame elements, a pair of rotatable threaded drive shafts journalled one above the other in said frame elements in spaced and parallel relation to the supporting surface of said framework and with the lowermost shaft adjacent thereto, a nut operatively engaging said lowermost drive shaft for longitudinal movement thereon and slidably engaging the supporting surface of said framework, a nut operatively engaging the upper drive shaft for longitudinal movement thereon, a member mounted on said frame elements in spaced and parallel relation to said upper drive shaft and engageable with said nut for preventing the rotation thereof, a beam pivotally mounted on said framework and extending longitudinally thereof adjacent said upper drive shaft, a test panel carriage mounted for movement on the supporting surface of said framework and engageable with the nut on the lower drive shaft for longitudinal movement therewith, means including cooperating portions on said test carriage and the nut on said lower drive shaft for laterally adjustably connecting said test carriage to said nut for longitudinal movement therewith, a test probe mounted on said beam and engageable with the coating on a panel on said panel carriage, a weight supporting carriage movable longitudinally on said beam and vertically slidably engageable with the nut on the upper drive shaft to establish a connection therewith for longitudinal movement with said nut, drive means for simultaneously rotating said shafts, and means mounted on one of said frame elements operable to tilt said beam to raise the probe from the panel.

JEROME R. MARCUS.

REFERENCES CITED

The following references are of record in the file of this patent:

UNITED STATES PATENTS

| Number | Name | Date |
| --- | --- | --- |
| 682,785 | Caldwell | Sept. 17, 1901 |
| 1,283,856 | Meyer | Nov. 5, 1918 |
| 1,497,405 | Robertson | June 10, 1924 |
| 1,917,200 | Bornstein | July 4, 1933 |
| 2,289,874 | Curtis | July 14, 1942 |
| 2,373,200 | Simmons et al. | Apr. 10, 1945 |
| 2,431,974 | Williams | Dec. 2, 1947 |

FOREIGN PATENTS

| Number | Country | Date |
| --- | --- | --- |
| 482,073 | Germany | Sept. 9, 1929 |